H. E. POPP.
VALVE.
APPLICATION FILED AUG. 26, 1918.

1,355,426.

Patented Oct. 12, 1920.
2 SHEETS—SHEET 2.

Inventor
Harry E. Popp
By Hull, Smith, Brown & West
Attys.

UNITED STATES PATENT OFFICE.

HARRY E. POPP, OF EAST CLEVELAND, OHIO.

VALVE.

1,355,426.  Specification of Letters Patent.  Patented Oct. 12, 1920.

Application filed August 26, 1918. Serial No. 251,513.

*To all whom it may concern:*

Be it known that I, HARRY E. POPP, a citizen of the United States, residing at East Cleveland, in the county of Cuyahoga and State of Ohio, have invented a certain new and useful Improvement in Valves, of which the following is a full, clear, and exact description, reference being had to the accompanying drawings.

My present invention pertains generally to improvements in valves, and more particularly to improvements in self-closing valves, the aim being to provide a device of this character that is peculiarly adapted for use as a secondary valve for actuating, or controlling the actuation of, some pressure fluid operated means, an example of its application being to control the auxiliary or sealing valve incorporated in the valve disclosed in my co-pending application Serial No. 229,714, filed April 20, 1918. This is cited as one of numerous instances of its use and should not be regarded as limiting the invention in any way to such or even an analogous use, for as will be appreciated from the following description, the invention is of quite general utility; and while I shall describe the present embodiment in detail, it will be understood that the invention is susceptible to all modifications falling within the scope of the claims annexed hereto.

Further objects of the invention are to provide a comparatively simple and durable construction for valves of the class to which this invention relates, comprising few parts and of a design expediting and cheapening manufacture; to provide an easily operating valve; one that may be conveniently actuated; one that may be controlled from a remote point through simple means; and one wherein the pressure fluid acts to automatically close the valve and retain it closed with a degree of firmness proportionate to the pressure of the fluid.

Figure 1:
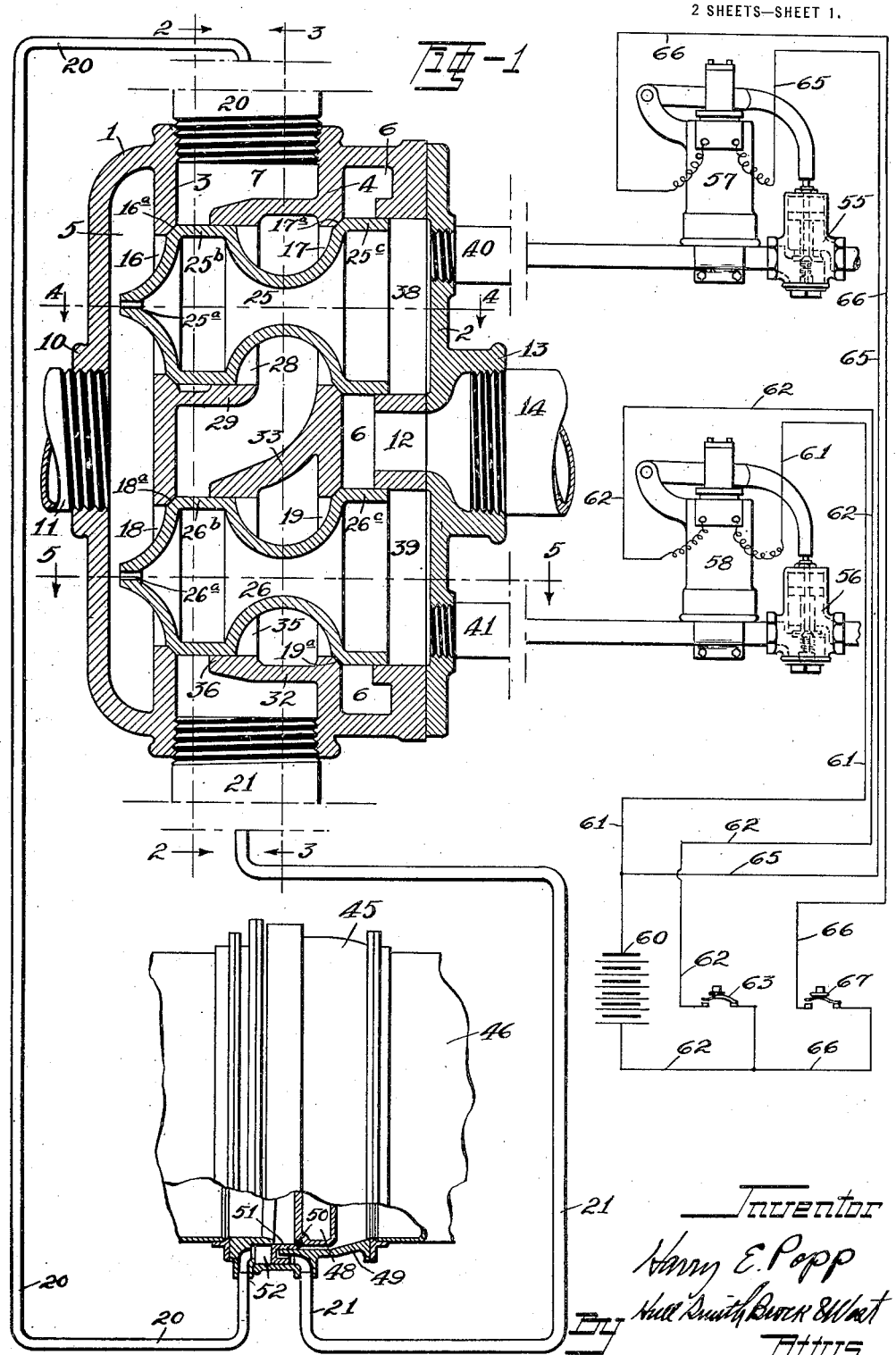
Figure 2:
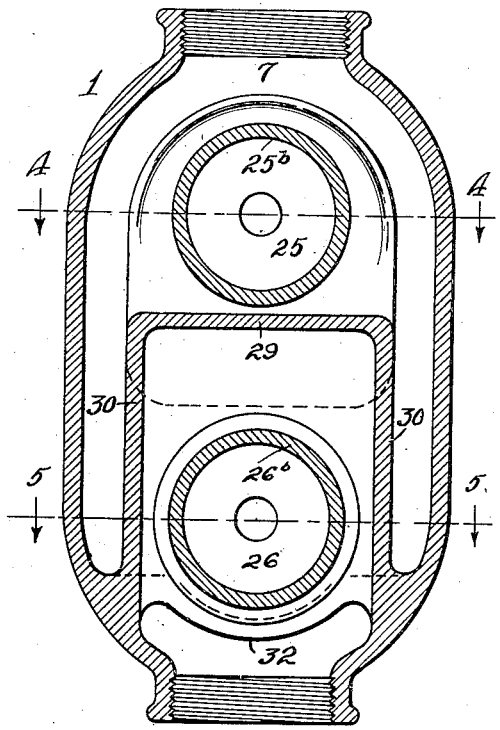
Figure 3:
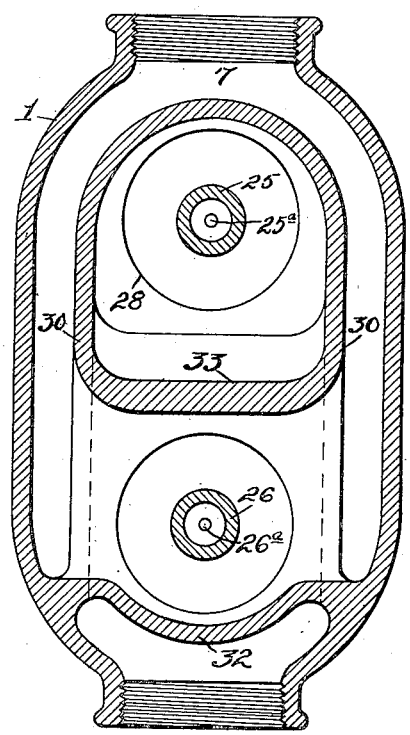
Figure 4:
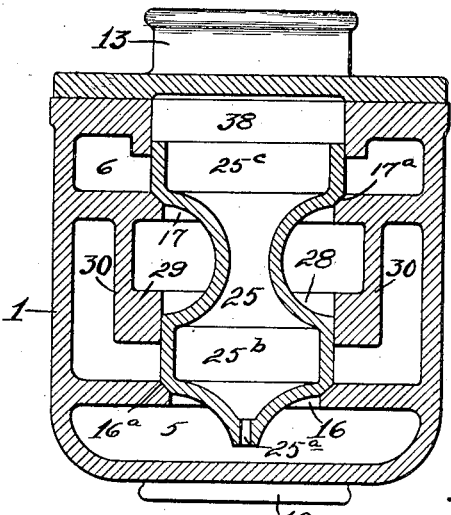
Figure 5:
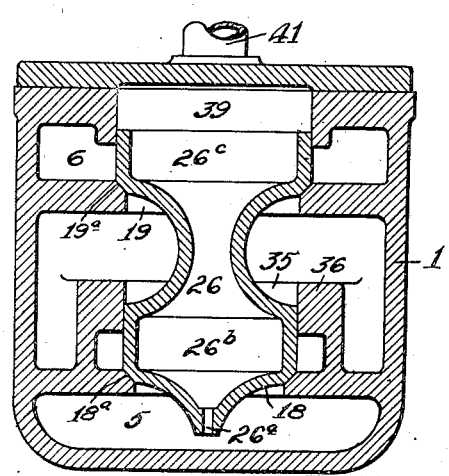

These, and further objects which will become apparent as this description proceeds, are attained in the valve illustrated in the accompanying drawings wherein Figure 1 is a diagrammatic representation of a system incorporating my improved valve, the valve being shown in section and considerably enlarged over the other elements of the system; Fig. 2 is a section on the line 2—2 of Fig. 1, looking toward the right; Fig. 3 is a section on the line 3—3 of Fig. 1, looking toward the left; and Figs. 4 and 5 are sectional details on the respective correspondingly numbered lines of Figs. 1 and 2.

The valve is composed of a casing 1 having an open side that is closed by a cover 2 and divided by partitions 3 and 4 into an admission chamber 5, exhaust chamber 6, and an intermediate chamber 7. One side of the casing is formed with an inlet extension 10 to which is connected a conduit 11 through which pressure fluid is supplied to the admission chamber 5. Fluid from the exhaust chamber 6 escapes through a port 12 formed in the exhaust side of the casing 1 and through the registering opening of an extension 13 of the cover 2 to which the exhaust conduit 14 is connected.

The partitions 3 and 4 have respective ports 16 and 17 that are in axial alinement, these ports constituting one set; and a second set consisting of the respective ports 18 and 19, which are also in axial alinement. At the upper and lower ends of the intermediate chamber 7 the casing 1 has connected to it the respective conduits 20 and 21. The arrangement of valves and partitions within the casing now to be described is made with the end in view of accomplishing either of two results, to wit: conducting fluid from the admission chamber 5 to the conduit 20 while simultaneously exhausting fluid from conduit 21 through the exhaust chamber; or conducting fluid from the admission chamber to conduit 21 while simultaneously exhausting fluid from conduit 20 through the exhaust chamber.

To this end, the sets of ports 16 and 17, and 18 and 19, are controlled by the respective valve bodies 25 and 26. It will be observed that the ports 16 and 18 are somewhat smaller than the ports 17 and 19, and that associated with each is a valve-seat bearing the reference numeral of its respective port augmented by the exponent $a$, and each valve body has seating portions for coöperation with the valve-seats of the ports which it controls. Each valve body is preferably made hollow, and is materially reduced in diameter at about its longitudinal center, and what I may term the forward ends of the respective valve bodies 25 and 26 have restricted openings $25^a$ and $26^a$, the opposite ends of the valve bodies being shown as fully open. The forward cylindrical portion $25^b$ of valve body 25 slidably fits within an opening 28 of a partition 29, this partition connecting with the partition 3 below the port 16, and with partition 4 above 17. This partition merges into webs 30 spaced inward from the side walls of the casing and which extend downward to where they join the side walls of the casing near the bottom thereof, as shown in Fig. 2. Because of this arrangement, the space into which the port 16 immediately opens has communication with the end of the casing to which the conduit 20 is connected, but is separated, so far as communication is concerned, from the end of the casing to which the conduit 21 is applied. By referring to Fig. 3, it will be seen that the webs 30 are interrupted in the zone of the valve 26 so that the space immediately inside the port 19 is in communication with the end of the casing into which conduit 20 opens. This space is separated from conduit 21 by the cross-partition 32 and from the space immediately inside the port 17 by the cross-partition 33, the former connecting at its ends to the side walls of the casing, while the latter merges at its ends into the webs 30. The forward cylindrical portion 26<sup>b</sup> of valve 26 is slidable within an opening 35 of a partition 36 which connects at bottom and top with the respective partitions 32 and 33, and at the sides, with webs 30. The rear cylindrical portions 25<sup>c</sup> and 26<sup>c</sup> of the respective valve bodies 25 and 26 are guided within the walls of the respective cylindrical chambers 38 and 39. These chambers, and the interiors of the valves 25 and 26 which, in effect, constitute parts thereof, are separated from all other parts of the casing except the admission chamber 5, wherewith they have communication through the restricted passageways 25<sup>a</sup> and 26<sup>a</sup> of the valve bodies. The chambers 38 and 39 may be exhausted through pipes 40 and 41, respectively, shown as attached to the cover 2.

The system wherein I have shown my improved valve incorporated includes a major valve designated generally 45, and situated in a main 46. This valve is the one hereinbefore referred to as constituting the subject matter of my copending application No. 229,714; and it is of the butterfly-valve type and comprises a disk 48 which is pivoted within the casing 49 and has a peripheral seat 50 for coöperation with the circumferential seating portion of an auxiliary or sealing valve element 51. This valve element is in the form of a ring piston and is reciprocable within an annular chamber 52, the chamber on one side of the valve element having communicative connection with one end of the valve casing 1 through conduit 20, while the chamber on the opposite side of the valve element has similar connection, through the conduit 20, with the opposite end of said casing. The respective pipes 40 and 41 contain valves 55 and 56, the former being adapted to be opened through the medium of a solenoid 57, and the latter, through the medium of solenoid 58. These valves and solenoids may be of any approved type, a standard outfit being shown for the purpose of illustration. 60 indicates a battery which represents the source of electrical energy, and one side of the battery has connection with one end of the winding of solenoid 58 through conductor 61, the other end of the winding having connection with the opposite side of the battery through conductor 62, the latter containing a manually actuated switch or push button 63. A conductor 65 joins conductor 61 near the battery and leads to one end of the winding of solenoid 57, a further conductor 66 connecting the opposite end of the solenoid winding to former conductor 62 which leads to the opposite side of the battery, the conductor 66 containing a manually operated switch or push button 67.

In the present lay out it is my purpose to conveniently actuate from a remote point the auxiliary or sealing valve 51 of major valve 45, through the instrumentality of what may be termed, under these circumstances, the secondary valve which constitutes the subject of this present case. When it is desired to remove the sealing valve from its seat so that the main valve 48 may be opened, the operator closes switch 63 energizing solenoid 58 and thereby opening valve 56. This results in exhausting chamber 39 of pressure fluid which has been acting to retain the valve body 26 in closed position, so that this valve body may be moved from seats 18<sup>a</sup> and 19<sup>a</sup> by the fluid pressure bearing against its forward end. With the ports 18 and 19 open, pressure fluid may flow from chamber 5, supplied through conduit 11, through port 18 and conduit 21 into chamber 52 on the side of the valve element or ring piston 51 which will result in removing it from closing position, while the fluid on the opposite side of the valve element or piston may escape through conduit 20, down about the side webs 30 and between the transverse partitions 32 and 33, through port 19 into the exhaust chamber 6 from which it is carried off through the conduit 14. Upon opening the switch 63, which in the present instance is accomplished by releasing the push button, the valve 56 will be permitted to close under the influence of a spring usual in valves of this nature, thus cutting off escape from the chamber 39. The pressure fluid will now accumulate within the chamber 39, being admitted through the passageway 26<sup>a</sup>, and will act to move the valve body 26 into closing position by reason of the fact that a greater cross-sectional area of the valve body is presented to the interior of the chamber 39 than is exposed through port 18 to the admission chamber 5. To reverse the operation of the auxiliary valve 51 and move it to its seat, the switch 67 is closed to energize solenoid 57 and open the valve 55, thereby exhausting chamber 38 and permitting the valve body 35 to be moved under the influence of the pressure fluid acting upon its forward end to open position. The fluid will now flow through port 16 and conduit 20 to the rear side of the valve element or ring piston 51, while the fluid in advance thereof flows out through conduit 21, upward between the side webs 30 above the cross-partition 33, and through port 17, exhaust chamber 6, and conduit 14. Upon the opening of the switch 67, the valve 55 resumes closed condition and the valve body 25 is moved by the accumulation of pressure fluid within the chamber 38 to closed position.

The system herein disclosed is to be taken merely as an illustration of one use of my invention, it being obvious that the invention may be employed in numerous other connections and actuated by many different means, mechanical or otherwise, electrical actuating means being selected in the present instance because of its convenience, and its simplicity of illustration.

Having thus described my invention what I claim is:—

1. A valve comprising a casing having opposed partitions one containing an inlet port and the other an outlet port that are in axial alinement, the casing having apertures opening into the space between said partitions, a partition separating said apertures and placing one in communication with the inlet and the other with the outlet port, a valve body having a part for closing each port, and means for effecting movement of the valve body.

2. A valve comprising a casing having opposed partitions one containing an inlet port and the other an outlet port that are in axial alinement, the casing having apertures opening into the space between said partitions, a partition separating said apertures and placing one in communication with each port, said partition having a guide opening, a valve body having a part for closing each port and a portion guided within the opening of the last mentioned partition, and means for effecting movement of the valve body.

3. A valve comprising a casing having opposed partitions containing respectively two inlet ports and two outlet ports, each inlet port being in axial alinement with one of the outlet ports and constituting therewith a set, the casing having apertures opening into the space between said partitions, partitions separating the apertures and placing an inlet port of one set and an outlet port of the other into communication with each aperture, valve bodies, one for closing the ports of each set, and means for effecting movement of the valve bodies.

4. A valve comprising a casing having opposed partitions containing respectively two inlet ports and two outlet ports, each inlet port being in axial alinement with one of the outlet ports and constituting therewith a set, the casing having apertures opening into the space between said partitions, partitions separating the apertures and placing an inlet port of one set and an outlet port of the other in communication with each aperture, each of the last-mentioned partitions having a guide opening in axial alinement with the ports of one set, valve bodies, one for closing the ports of each set, each valve body having a portion guided within the opening of each of the last mentioned partitions, and means for effecting movement of the valve bodies.

5. A valve comprising a casing having opposed partitions containing respectively two inlet ports and two outlet ports, each inlet port being in axial alinement with one of the outlet ports and constituting therewith a set, the casing having apertures opening into the space between said partitions, partitions separating the apertures and placing an inlet port of one set and an outlet port of the other in communication with each aperture, valve bodies, one for closing the ports of each set, each of the last mentioned partitions having an opening in axial alinement with the ports of one set and the corresponding valve body having a portion closing and reciprocating within said opening, the opposite ends of each valve body being of different areas, that of lesser area being exposed to the fluid supply through the inlet port, a chamber containing the end of greater area of each valve body, each valve body having a port opening through both its ends, and means for exhausting each chamber.

6. A valve comprising an open sided casing having partitions spaced inward at different distances from and substantially parallel to the open side, an outlet port in the partition nearest the open side and an inlet port in the other partition in axial alinement with the outlet port but of a lesser area, the casing having apertures opening into the space between said partitions, a partition separating said apertures and placing one in communication with each port, each port being surrounded by a valve seat facing toward the open side of the casing, a valve body adapted to be inserted through the open side of the casing and having a part for coöperation with each valve seat, a cover for the open side of the casing, and means for effecting movement of the valve body.

7. A valve comprising a casing having opposed partitions containing respectively an inlet port and an outlet port that are in axial alinement, the latter being of greater area than the former, each port being surrounded by a valve seat facing in the direction of progress in size of the ports, a hollow open ended valve body projecting through the outlet port and having a part for coöperation with each seat, a chamber within which the open end of the valve body beyond the outlet port has a sliding fit, the opposite end of the valve body having an opening, the casing having apertures opening into the space between the aforesaid partitions, a partition separating said apertures of the casing and placing one in communication with each port, and means for exhausting the aforesaid chamber.

8. A valve comprising a casing having opposed partitions containing respectively an inlet port and an outlet port that are in axial alinement, the latter being of greater area than the former, each port being surrounded by a valve seat facing in the direction of progress in size of the ports, a valve body projecting through the outlet port and having a part for coöperation with each seat, a chamber within which the end of the valve body beyond the outlet port has a sliding fit, the valve body having a through opening, the casing having apertures opening into the space between the aforesaid partitions, a partition separating said apertures of the casing and placing one in communication with each port, the last mentioned partition having an opening closed by and within which a part of the valve body is reciprocable, the cross sectional area of the valve body between said last mentioned partition and outlet port being materially reduced, and means for exhausting the aforesaid chamber.

9. A valve comprising a casing having opposed partitions containing respectively an inlet port and an outlet port that are in axial alinement, the latter being of greater area than the former, each port being surrounded by a valve seat facing in the direction of progress in size of the ports, a hollow open ended valve body projecting through the outlet port and having a part for coöperation with each seat, a chamber within which the open end of the valve body beyond the outlet port has a sliding fit, the opposite end of the valve body having an opening, the casing having apertures opening into the space between the aforesaid partitions, a partition separating said apertures of the casing and placing one in communication with each port, the last mentioned partition having an opening closed by and within which a part of the valve body is reciprocable, the cross sectional area of the valve body between said last mentioned partition and outlet port being materially reduced, and means for exhausting the aforesaid chamber.

10. A valve comprising a casing having an inlet port and an exhaust port, each incorporating a valve seat facing in the same direction as the valve seat of the other, the casing also having two apertures, and a partition separating said apertures while placing each in communication with one of the ports, a valve body having a part for coöperation with each seat, and means for controlling movement of the valve body.

11. A valve comprising a casing having an inlet port and an exhaust port, each incorporating a valve seat facing in the same direction as the valve seat of the other, the casing also having two apertures, and a partition separating said apertures while placing each in communication with one of the ports, a valve body having a part for coöperation with each seat, one end of the valve body being exposed through the inlet port, a chamber wherein the opposite end of the valve body has a sliding fit, the area of the end exposed through the inlet port being less than the area of that within the chamber, the valve body having a through-port, and means for exhausting the chamber.

12. A valve comprising a casing having an inlet port and an exhaust port, each incorporating a valve seat facing in the same direction as the valve seat of the other, the casing also having two apertures and a partition separating said apertures while placing each in communication with one of the ports, the partition having a guide opening, said guide opening and the aforesaid ports being in axial alinement, a valve body having a part for coöperation with each valve seat and a portion fitting and adapted to slide within the guide opening of the partition, and means for controlling movement of the valve body.

13. A valve structure involving two sets of ports each set consisting of an inlet and an outlet port, and two alternative inlet and outlet passageways each communicating with the inlet port of a respective set and the outlet port of the other; means incorporating valve parts for closing the ports of each set; and means for actuating the former means to open and close the ports.

14. A valve structure involving two sets of ports each set consisting of an inlet and an outlet port, and two alternative inlet and outlet passageways each communicating with the inlet port of a respective set and the outlet port of the other; a valve element associated with each set and having parts for closing the ports thereof; and means for actuating the valve elements to open and close the ports.

15. A valve structure involving two sets of ports each consisting of an inlet and an outlet port, and two alternative inlet and outlet passageways each communicating with the inlet port of a respective set and the outlet port of the other; means incorporating valve parts for closing the ports of each set; the structure including chambers for the accumulation of pressure fluid, and said means having parts disposed within said chambers so that upon the accumulation of pressure fluid within the chambers said means are moved to close the ports; and further means for releasing the pressure fluid from the chambers.

16. A valve structure involving two sets of ports each set consisting of an inlet and an outlet port, and two alternative inlet and outlet passageways each communicating with the inlet port of a respective set and the outlet port of the other; a valve element associated with each set and having parts for closing the ports thereof; the structure including chambers and the valve elements parts disposed within said chambers and passageways through which pressure fluid is conducted from beyond the inlet ports to said chambers so that upon an accumulation of pressure fluid within the chambers the valve elements will be moved to close the ports; and means for releasing the pressure fluid from the chambers.

17. A valve structure involving an inlet port, an outlet port, two openings and a partition separating the ports and placing one of said openings in communication with each port; means incorporating valve parts for closing the inlet and outlet ports; and means for operating the former means to open and close the ports.

18. A valve structure involving an inlet port, an outlet port, and two openings each communicating with a respective port; means incorporating valve parts for closing the ports; the structure including a chamber for the accumulation of pressure fluid, and said means having a part disposed within said chamber so that upon an accumulation of pressure fluid within the chamber said means are moved to close the ports; and further means for releasing the pressure fluid from the chamber.

19. A valve structure involving an inlet port, an outlet port, and two openings each communicating with a respective port; a valve element having parts for closing the ports; the structure including a chamber and the valve element a part disposed within said chamber and a passageway through which pressure fluid is conducted from beyond the inlet port to the chamber whereby pressure fluid may accumulate within the chamber and move the valve element to close the ports; and means for releasing the pressure fluid from the chamber.

In testimony whereof, I hereunto affix my signature.

HARRY E. POPP.